Feb. 15, 1927.
M. P. OHLSEN
1,617,821
SPROCKET TYPE SOIL PULVERIZER
Filed Sept. 20, 1926
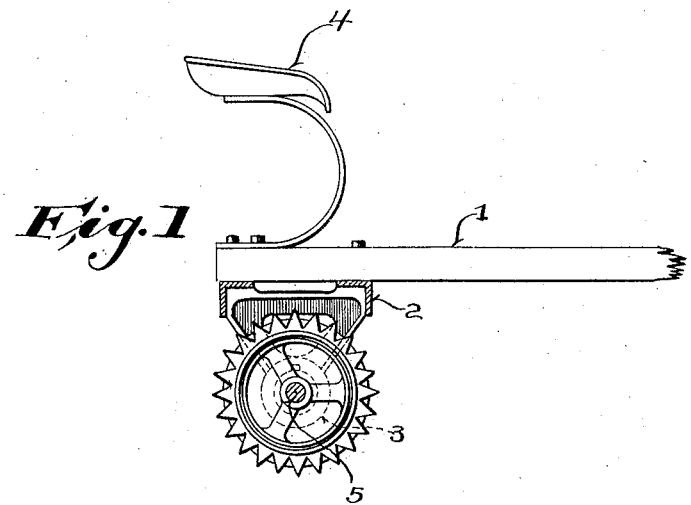
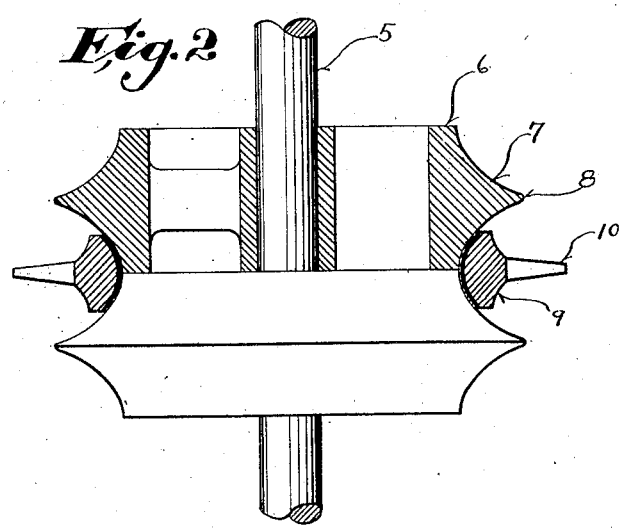
Inventor
Mark P. Ohlsen
By
Attorneys Patented Feb. 15, 1927.

1,617,821

UNITED STATES PATENT OFFICE.

MARK P. OHLSEN, OF BRILLION, WISCONSIN, ASSIGNOR TO BRILLION IRON WORKS, OF BRILLION, WISCONSIN.

SPROCKET-TYPE SOIL PULVERIZER.

Application filed September 20, 1926. Serial No. 136,532.

This invention relates to a soil pulverizer, and is particularly directed to a sprocket type pulverizer.

Objects of this invention are to provide a novel form of pulverizer in which the sprocket rings are mounted on the outer periphery of the disc wheels, so that they will function as a scraper and clean the outer faces of the main disc wheels of soil or material that collects thereon, and to so construct these sprocket rings that they do not have to be fitted upon a shaft or hub of the disc wheels, but in which they loosely fit upon the outer periphery of the disc wheels, so that no change whatsoever need be made in the standard construction of disc wheels in adapting it to use with this type of sprocket wheel.

Further objects are to provide sprocket rings or wheels which may be used to pulverize the soil in connection with disc wheels, and which may be easily removed from the disc wheels, so that the machine can be used as a plain packer, and in which when the sprocket wheels are slipped over the disc wheels the machine is immediately converted into a mulcher.

Further objects are to provide a novel form of toothed or sprocket ring, in which the ring does not have to be accurately fitted to the device and does not have to have additional lugs, bearings, or other members of this type and consequently, may be made with the utmost cheapness.

An embodiment of the invention is shown in the accompanying drawings in which:—

Figure 1 is a view of a pulverizer, such view being partly in section;

Figure 2 is an enlarged view partly in section showing a pair of disc wheels and a sprocket ring.

Referring to the drawings, it will be seen that the machine generally has the same type of frame work as the standard machine. For example, it may have the usual drawbar 1, frame 2, and bearing members 3, supported from the frame, and a driver's seat 4. The bearing 3 carries the horizontal shaft 5 arranged transversely of the machine and this shaft carries the usual disc wheels 6 which are loosely positioned thereon and are in abutting relation to each other to permit independent rotation of the wheels as required. These disc wheels are usually made with concave surfaces 7 which form a central rib 8. The sprocket rings have a body portion 9 contoured to loosely fit the surfaces 7 and are adapted to ride upon these surfaces between and upon successive disc wheels. These wheels 9 are provided with teeth or sprockets 10 which, as may be seen from Figure 2, are positioned between the ribs 8 of successive disc wheels.

In using the device the disc wheels function in the usual capacity and the sprocket wheels powder or pulverize the soil. In addition to this function the sprocket rings also act as scrapers with reference to the disc wheels with which they are associated. They break up any adhering chunks of dirt, mud, or other material, that may cling to the disc wheel, and thus prevent clogging of the machine.

In addition to these characteristics, the sprocket wheels may be applied as an accessory to the usual types of disc wheel machines without changing the machines in any particular. Obviously, after the sprocket wheels have served their purpose they may be removed and the machine may be used as an ordinary packer.

It will be seen, therefore, that a very simple type of machine has been provided by this invention, which possesses marked advantages over the usual types of pulverizers and which may be very simply and cheaply constructed.

It will be seen further that the sprocket wheels or toothed wheels may be applied to the conventional type of pulverizer or mulcher without any change whatsoever in the mechanism of the machine.

Although the invention has been described in considerable detail, such description is intended as illustrative rather than limiting as the invention may be variously embodied and as the scope of such invention is to be determined as claimed.

I claim:

1. A pulverizing machine adapted to be drawn over the ground comprising a main frame work, a transverse shaft carried thereby, a plurality of disc wheels independently mounted upon said transverse shaft, each of said disc wheels having a central rib and having outer faces on opposite sides of said rib, and a plurality of rings loosely mounted upon said outer faces and overlapping portions of the adjacent disc wheels, said rings having a plurality of teeth projecting outwardly therefrom.

2. A pulverizer comprising a frame, a transverse shaft carried thereby, a plurality of independently mounted disc wheels carried by said shaft, each disc wheel having a centrally located rib and a pair of concave outer faces, a plurality of rings mounted wholly exteriorly of and loosely fitting the concave outer faces of said disc wheels and overlapping adjacent disc wheels, said rings being provided with a plurality of outwardly projecting teeth.

In testimony that I claim the foregoing I have hereunto set my hand at Milwaukee, in the county of Milwaukee and State of Wisconsin.

MARK P. OHLSEN.